United States Patent
Koru et al.

(10) Patent No.: US 12,353,369 B2
(45) Date of Patent: Jul. 8, 2025

(54) SYSTEMS AND METHODS OF ANALYZING USER-ENTERED OR MACHINE-GENERATED VALUES IN DATA FOR DETERMINING DEFECTIVE ENTRIES

(71) Applicant: University of Maryland, Baltimore County, Baltimore, MD (US)

(72) Inventors: Gunes Koru, Columbia, MD (US); Yili Zhang, Arbutus, MD (US); Pratik Tamakuwala, Arbutus, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 0 days.

(21) Appl. No.: 17/734,236

(22) Filed: May 2, 2022

(65) Prior Publication Data

US 2022/0358102 A1 Nov. 10, 2022

Related U.S. Application Data

(60) Provisional application No. 63/182,051, filed on Apr. 30, 2021.

(51) Int. Cl.
*G06F 16/00* (2019.01)
*G06F 16/215* (2019.01)
*G06F 16/25* (2019.01)

(52) U.S. Cl.
CPC .......... *G06F 16/215* (2019.01); *G06F 16/258* (2019.01)

(58) Field of Classification Search
None
See application file for complete search history.

(56) References Cited

U.S. PATENT DOCUMENTS

2015/0285041 A1* 10/2015 Dancek ................ F04B 49/065
  417/46
2023/0113369 A1* 4/2023 Wang ................. H04L 63/0272
  709/204

FOREIGN PATENT DOCUMENTS

WO   WO-2014028299 A1 *  2/2014  .......... A61B 5/4082

OTHER PUBLICATIONS

Kouji et al., "Input error detection device",Sep. 2019, translated from foreign application DE-102019002066-A1, 8 pages. (Year: 2019).*

* cited by examiner

*Primary Examiner* — Bai D Vu
(74) *Attorney, Agent, or Firm* — Olive Law Group, PLLC

(57) ABSTRACT

Systems and methods of analyzing user-entered or machine-generated values in data for determining defective entries are disclosed. According to an aspect, a system includes a data entry analyzer comprising at least one processor and memory configured to receive data including a plurality of user-entered or machine-generated values, wherein each user-entered or machine-generated value is organized in at least one predetermined entry format. The data entry analyzer is also configured to determine an entry constraint for each of the at least one predetermined entry formats. Further, the data entry analyzer is configured to analyze each user-entered or machine-generated value based on the determined entry constraint associated with the predetermined entry format of that user-entered or machine-generated value. The system also includes a user interface configured to present notification of the one or more defective entries.

16 Claims, 8 Drawing Sheets

Table 3. Data defect counts and densities

| Subsystem | Table Name | Missingness | | Incorrectness | Syntax Violation | | Semantic Violation | | Duplicity | | Defects | Defect Density (%) | Defective Cells | Defective Cells Density (%) |
|---|---|---|---|---|---|---|---|---|---|---|---|---|---|---|
| | | Required Missing | Conditionally Missing | Implausible Value | Invalid Code | Format Mismatch | Dependency | Contract | DAE | DAF | | | | |
| Procedure | Claim Type | 0 | NA | NA | 61 | NA | NA | NA | NA | NA | 61 | 8.40 ± 2.02 | 61 | 8.40 ± 2.02 |
| | Coverage Group | 0 | NA | NA | 911 | NA | NA | NA | NA | NA | 911 | 0.45 ± 0.03 | 911 | 0.45 ± 0.03 |
| | Master | 2 | 865 | 2 | 104,501 | 0 | 1480 | NA | 766 | NA | 107,616 | 5.58 ± 0.03 | 106,867 | 5.34 ± 0.03 |
| | Modifier | 0 | 0 | NA | 87,818 | NA | NA | NA | NA | NA | 87,818 | 15.88 ± 0.10 | 87,818 | 15.88 ± 0.10 |
| | Place of Service | 0 | 0 | NA | 2153 | NA | NA | NA | NA | NA | 2153 | 1.86 ± 0.08 | 2153 | 1.86 ± 0.08 |
| | Price | 2 | 100,811 | 1 | 25,453 | NA | 436 | NA | NA | NA | 126,703 | 4.27 ± 0.02 | 126,703 | 4.27 ± 0.02 |
| | Provider Type | 0 | NA | NA | 3983 | NA | 2027 | NA | NA | NA | 6010 | 5.12 ± 0.13 | 5464 | 4.66 ± 0.12 |
| | Specialty Code | 0 | 0 | NA | 324 | NA | 651 | NA | NA | NA | 975 | 13.84 ± 0.91 | 855 | 13.94 ± 0.87 |
| Provider | Address | 10 | NA | 0 | 23,338 | 95,536 | 103,124 | NA | 0 | NA | 221,988 | 10.20 ± 0.04 | 173,763 | 7.98 ± 0.04 |
| | Category of Service | 9 | NA | 0 | 50,535 | 75,095 | 38,502 | NA | 0 | 0 | 164,149 | 3.64 ± 0.02 | 158,438 | 3.52 ± 0.02 |
| | Enrollment Period | 0 | NA | 0 | 19,857 | 66,837 | 2.2 | NA | 0 | NA | 86,726 | 6.32 ± 0.04 | 86,726 | 6.32 ± 0.04 |
| | Group | 0 | NA | 1 | 517 | 24,275 | 52 | NA | 0 | NA | 24,845 | 3.64 ± 0.04 | 24,845 | 3.64 ± 0.04 |
| | Lab Classifications | 0 | NA | 5 | 3631 | 1525 | NA | NA | 0 | NA | 5161 | 5.61 ± 0.15 | 5161 | 5.61 ± 0.15 |
| | Master | 71,445 | 0 | 402,364 | 571,667 | 641,527 | 446,140 | NA | 0 | 60 | 2,133,203 | 13.33 ± 0.02 | 1,870,457 | 11.68 ± 0.02 |
| | Receiver | 0 | NA | 0 | 0 | 6639 | NA | NA | 0 | NA | 6639 | 3.64 ± 0.08 | 6639 | 3.54 ± 0.08 |
| | Specialty | 0 | NA | 76 | 33,802 | 36,084 | 12,542 | NA | 0 | NA | 152,369 | 13.43 ± 0.06 | 144,504 | 12.74 ± 0.06 |
| | Supplement | 0 | NA | 0 | 3791 | 20,644 | NA | NA | 0 | NA | 24,435 | 7.72 ± 0.09 | 24,435 | 7.72 ± 0.09 |
| | Total | 71,468 | 101,676 | 402,457 | 938,342 | 968,142 | 606,976 | | 766 | 60 | 3,151,743 | 9.74 ± 0.01 | 2,823,783 | 8.73 ± 0.01 |

Values are mean ± SD, unless otherwise indicated.
DAE: duplication across entities; DAF: duplication across features; NA: Not Applicable (due to no constraints defined).

FIG. 6

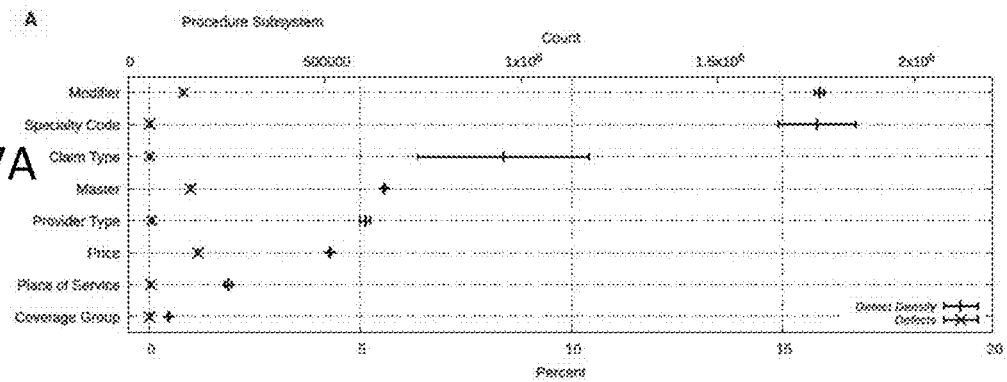
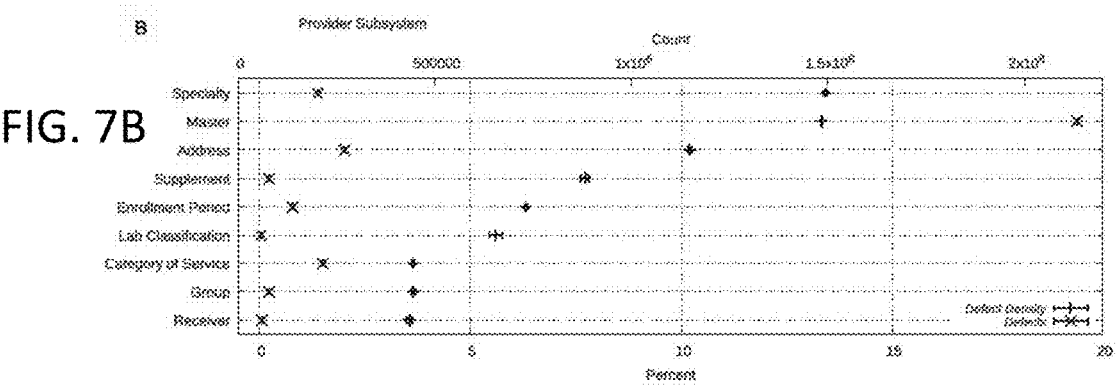
Figure 2. Defect count and density for the tables in the (A) Procedure and (B) Provider subsystems with the 95% confidence intervals.
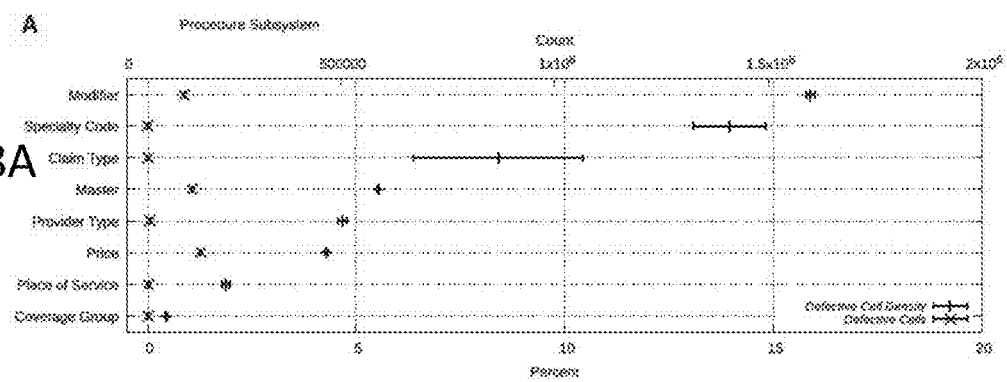
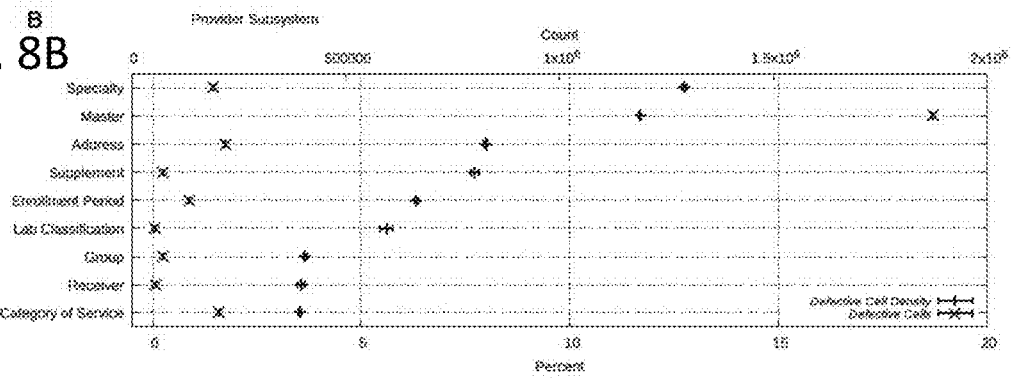

SYSTEMS AND METHODS OF ANALYZING USER-ENTERED OR MACHINE-GENERATED VALUES IN DATA FOR DETERMINING DEFECTIVE ENTRIES

CROSS REFERENCE TO RELATED APPLICATION

This application claims priority to U.S. Provisional Patent Application No. 63/182,051, filed Apr. 30, 2021, and titled DATA QUALITY TOOLKITS, SYSTEMS, AND RELATED METHODS, the content of which is incorporated herein by reference in its entirety.

TECHNICAL FIELD

The presently disclosed subject matter relates generally to data analysis, sorting, and presentation. Particularly, the presently disclosed subject matter relates to systems and methods of analyzing user-entered or machine-generated values in data for determining defective entries.

BACKGROUND

Collecting, maintaining, and leveraging data to support decision making and daily operations are important targets in healthcare organizations. Consistent with Moore's and Kryder's laws of exponential increase of computational power and information storage, healthcare data have seen a rapid growth. In addition, with better methods of extracting information, translating information to knowledge, and deriving appropriate actions, the value of healthcare data as well as the number of data users have increased and are expected to increase even more rapidly in the near future. Accompanying these trends, data quality problems are uncovered at an increasing rate, presenting challenges to healthcare organizations in leveraging their data assets.

In this context, data quality is generally defined through fitness for use (i.e., serving the needs of users pursuing certain goals). Incorrect, inconsistent, or missing data are examples of data quality problems. According to a study from Oracle, healthcare providers lose on average of $70.2 million annually, 15% of potential revenue per hospital, because of their inability to interpret and translate data into actionable insight due to the poor quality of the large volumes of data they collect. Generally speaking, it can be argued that a lack of data quality detracts from the quality, effectiveness, and efficiency of healthcare services by leading to imprecise, useless, or even misleading results and suboptimal decision making.

The reasons behind the lack of data quality are often multifaceted and challenging. Various information technology (IT) software development and adoption problems such as software design flaws (e.g., no input validation in user interfaces), lack of documentation, lack of user training, or delays in system updates can negatively impact data quality. However, the essential problems are arguably associated with the basic laws of software evolution: software systems actively used in real world face constant pressure from the environment to accommodate changing and new requirements such as new healthcare workflows, policies, regulations, and laws. However, meeting those requirements during the evolution of a software system becomes increasingly more difficult and costly due to typically increasing software size and complexity. Software improvements, upgrades, and fixes often performed with limited budgets might easily overlook ensuring that software (e.g., user interface) is of high quality, documentation is updated, sufficient training is provided, or the system receives and validates data correctly. In addition, it is important to guarantee that various data import, export, migration, and transportation operations avoid incorrectly modifying data. The previously mentioned challenges can be exacerbated by the separation of data creators and data users. In this quite common scenario, while data users experience the data quality problems and suffer the consequences, those who create data might lack the same concerns, interest, and motivation to address the problems.

Therefore, continuous monitoring of data quality becomes an important step to be able to provide useful feedback into organizational IT software adoption and maintenance processes. While a few prior studies focused on dirty data inspection by using ad hoc techniques, generally, there is a need for systematic approaches for understanding and assessing data quality. Consequently, current initiatives in healthcare organizations are often carried out in an ad hoc manner. To advance the state of the art, contributing to the knowledge about the types of data quality problems is very important. Such knowledge can facilitate the communication within the organization while detecting and resolving data defects. In addition, obtaining evidence about the prevalence of problems is important for raising knowledge and awareness about data quality, which in turn, can facilitate the initiatives aiming to improve data quality in health organizations.

BRIEF DESCRIPTION OF THE DRAWINGS

Figure 1:
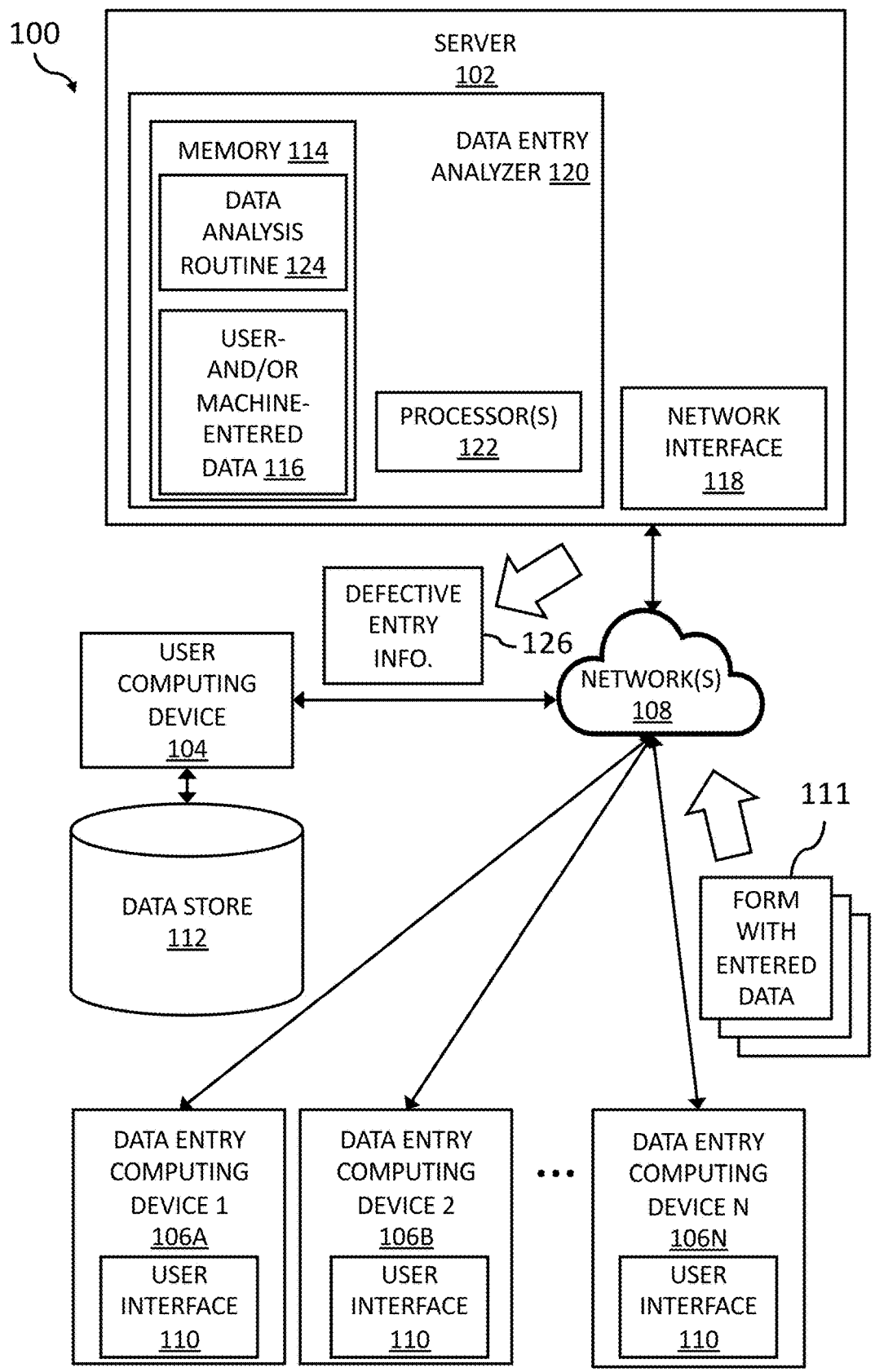
Figure 2:
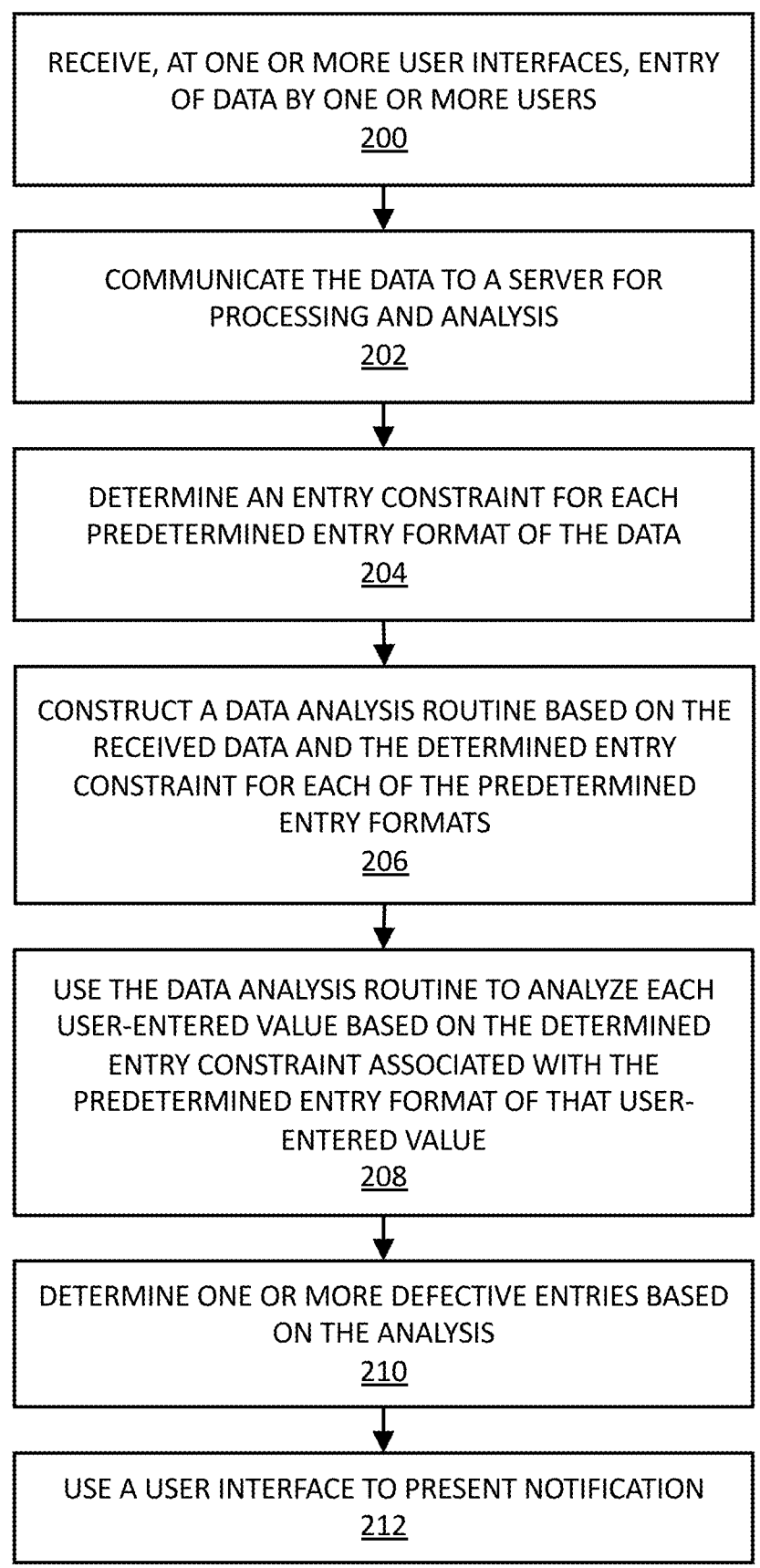
Figure 3:
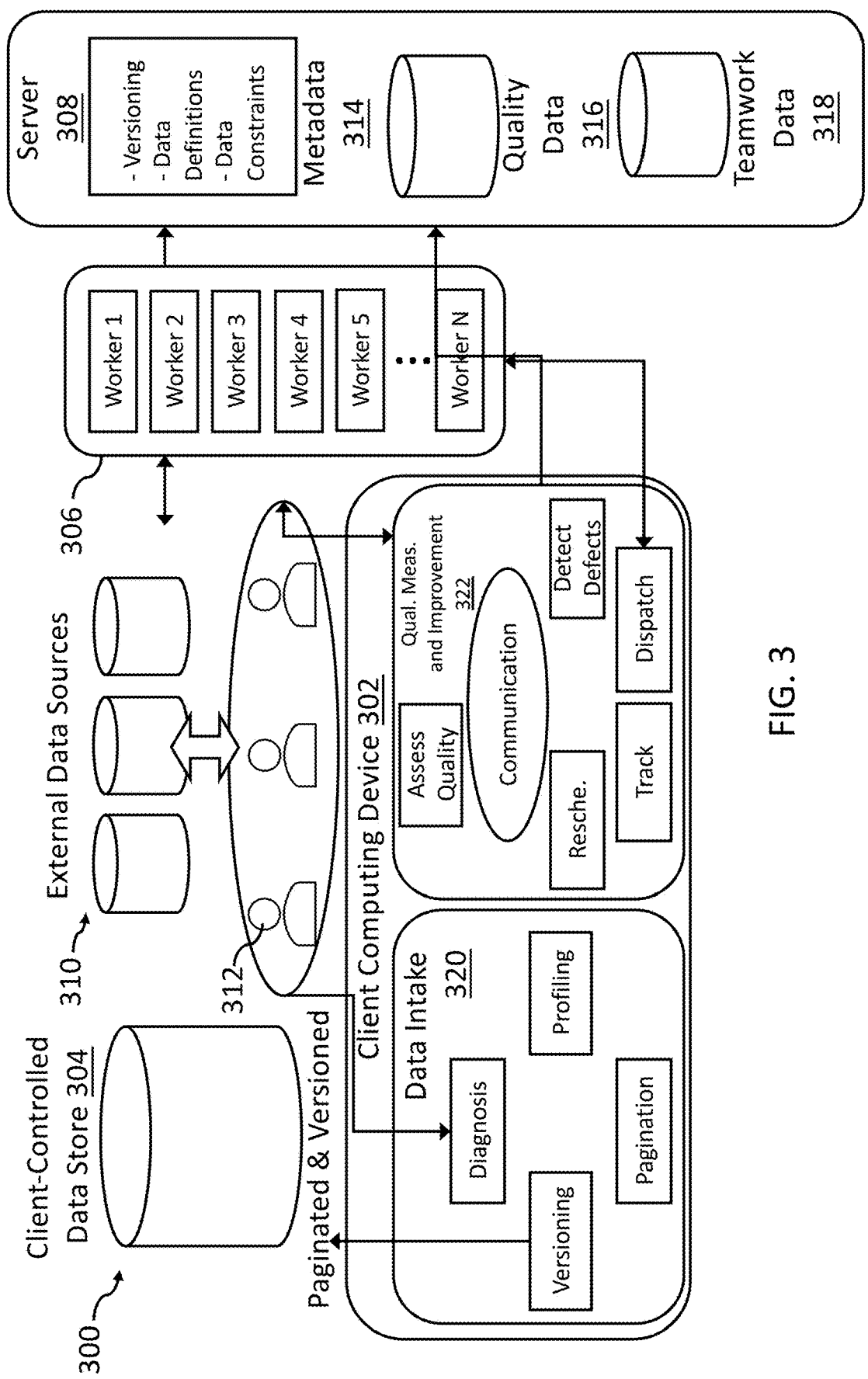
Figure 4:
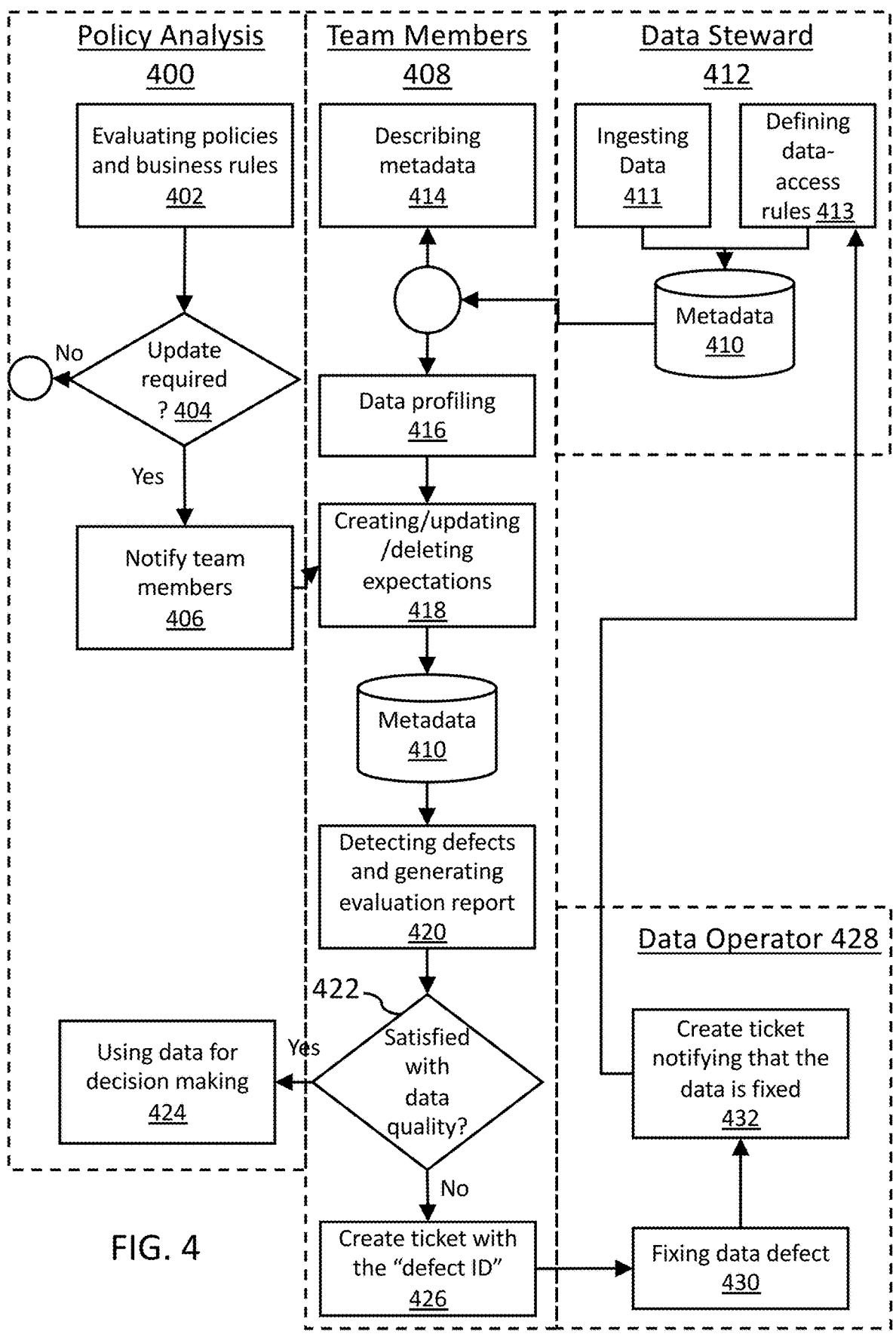
Figure 5:
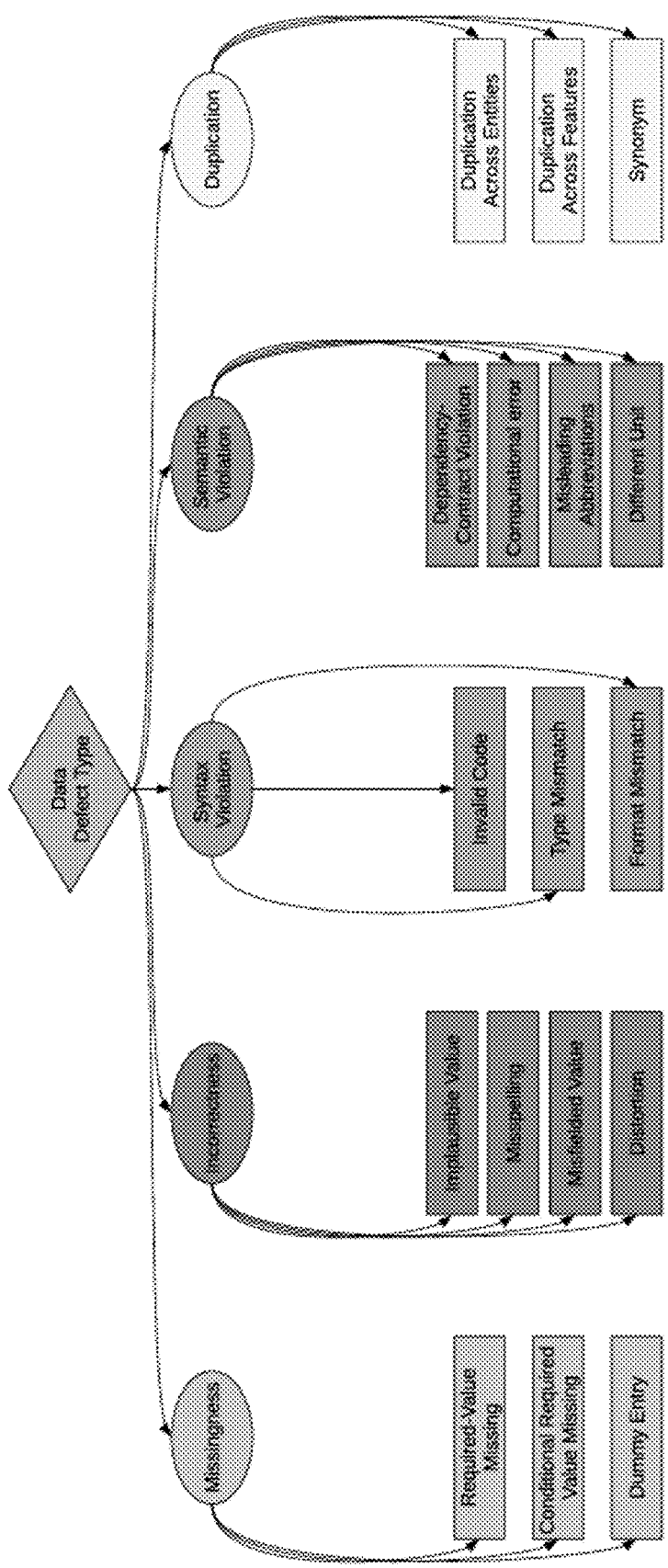
Figure 9:
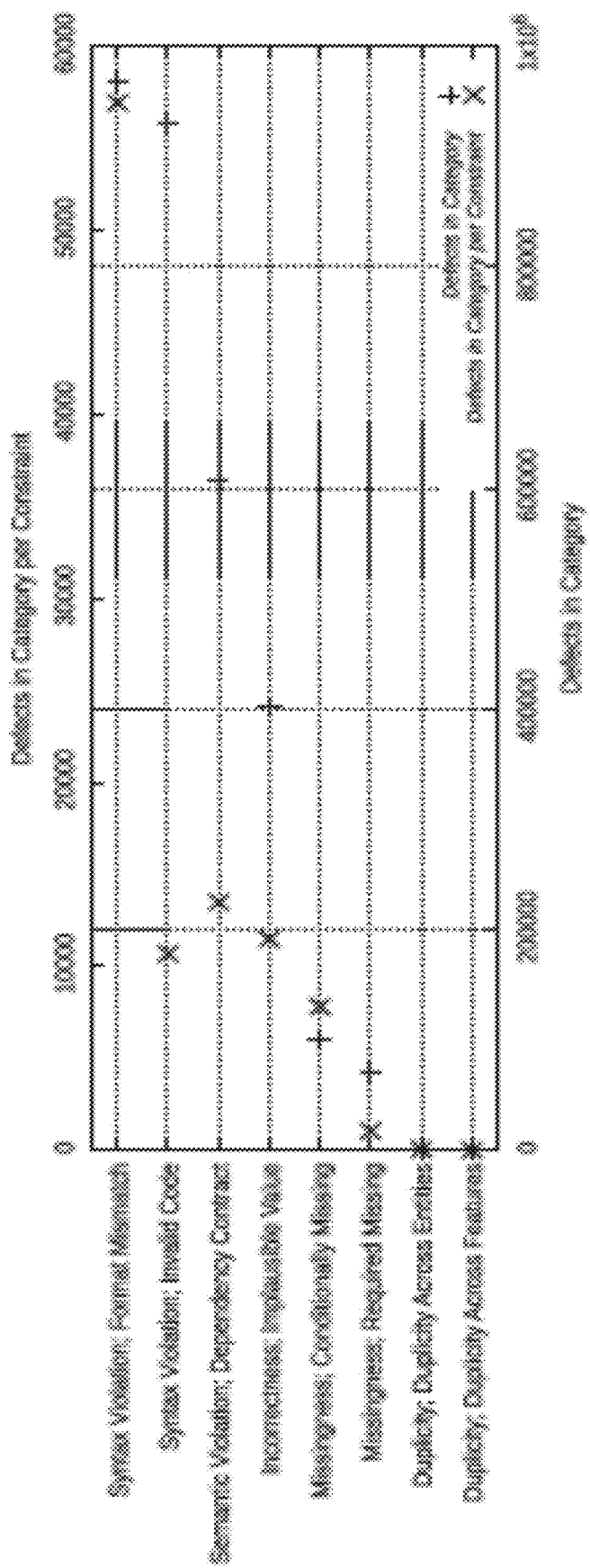

Having thus described the presently disclosed subject matter in general terms, reference will now be made to the accompanying Drawings, which are not necessarily drawn to scale, and wherein:

FIG. 1 is a block diagram of a system of analyzing user-entered or machine-generated value in data for determining defective entries in accordance with embodiments of the present disclosure;

FIG. 2 is a flow diagram of a method of analyzing user-entered or machine-generated value in data for determining defective entries in accordance with embodiments of the present disclosure;

FIG. 3 is a block diagram of a system of detecting defective entries in data and presenting notification of the detected defective entries in accordance with embodiments of the present disclosure;

FIG. 4 is a flow diagram of a method of detecting defective entries in data and presenting notification of the detected defective entries in accordance with embodiments of the present disclosure;

FIG. 5 is a graph showing example taxonomy tree for data defects and programmer errors for various reasons such as calculation or data entry mistakes;

FIG. 6 is a table showing the number of defects detected by applying the set of constraints create;

FIGS. 7A and 7B are graphs depicting defect counts and densities tables;

FIGS. 8A and 8B are graphs depicting counts and densities of defective cells; and FIG. 9 is a graph showing the number of defects and number of defects per constraint in each category and subcategory.

SUMMARY

The presently disclosed subject matter relates to systems and methods of analyzing user-entered or machine-generated values in data for determining defective entries. According to an aspect, a system includes a data entry analyzer comprising at least one processor and memory configured to receive data including a plurality of user-entered or machine-generated values, wherein each value is organized in at least one predetermined entry format. The data entry analyzer is also configured to determine an entry constraint for each of the at least one predetermined entry formats. Further, the data entry analyzer is configured to analyze each value based on the determined entry constraint associated with the predetermined entry format of that value. The system also includes a user interface configured to present notification of the one or more defective entries.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Unless otherwise defined, all technical terms used herein have the same meaning as commonly understood by one of ordinary skill in the art to which this disclosure belongs.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a GUI that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object. In yet another example, a user interface can include a suitable controller such as a gaming controller. A gaming controller may include one or more buttons, one or more joysticks, one or more sliders, or the like for inputting instruction to the connected computing device. A gaming controller may also include feedback components such as a display, or haptic feedback components, or the like.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

In accordance with embodiments, systems and methods are disclosed that can utilize a taxonomy for data defects (referred to herein as "defects"). These systems and methods can use the taxonomy to assess the prevalence of defects in health datasets. The taxonomy can be applied as a routine to current data and subsequently-received data to analyze the data for determining defective entries. Further, systems and methods disclosed herein can construct and provide three-dimensional (3D) and virtual reality (VR) interfaces and tools for a user to view and alter presentation of the data. The systems and methods disclosed herein can also use the 3D interface and/or VR interface to present determined defective entries. Such interfaces and tools can help to improve the user's understanding of the data. A defect refers to a deviation from an expectation placed on data for achieving or maintaining fitness for use. For a set of stated expectations, higher numbers of defects are associated with lower data quality and vice versa.

In an example application, the systems and methods disclosed herein, systems and methods disclosed herein may be used to understand the quality of the data residing in a healthcare data management system, such as the Medicaid Management Information System (MMIS). For example, the data may reside in the system's procedure and provider subsystems, which may include data about Medicaid procedures and providers, respectively.

Table 1 below shows example information about the datasets which were organized as tables. Therefore, this disclosure adopts the language associated with the standard tabular organization of datasets by using terms understood by those of skill in the art, such as table, row (or record), column, cell (at the intersection of a column and a row), and value (datum in a cell). As seen in Table 1, the MMIS data examined in a study included more than 32 million cells.

TABLE 1

Medicaid datasets

| Subsystem | Table name | Columns | Rows | Cells |
|---|---|---|---|---|
| Procedure | Claim Type | 3 | 242 | 726 |
| Procedure | Coverage Group | 3 | 67 465 | 202 395 |
| Procedure | Master | 55 | 35 076 | 1 929 180 |
| Procedure | Modifier | 3 | 184 378 | 553 134 |
| Procedure | Place of Service | 3 | 38 564 | 115 692 |
| Procedure | Price | 8 | 371 177 | 2 964 416 |
| Procedure | Provider Type | 3 | 39 093 | 117 279 |
| Procedure | Specialty | 3 | 2 052 | 6 156 |
| Provider | Address | 9 | 241 875 | 2 176 875 |
| Provider | Category of Service | 12 | 375 541 | 4 506 492 |
| Provider | Enrollment Period | 4 | 342 877 | 1 371 508 |
| Provider | Group | 6 | 113 723 | 682 338 |
| Provider | Lab Classification | 5 | 18 408 | 92 040 |

TABLE 1-continued

Medicaid datasets

| Subsystem | Table name | Columns | Rows | Cells |
|---|---|---|---|---|
| Provider | Master | 97 | 165 036 | 16 008 492 |
| Provider | Receiver | 7 | 26 812 | 187 684 |
| Provider | Specialty | 6 | 189 100 | 1 134 600 |
| Provider | Supplement | 4 | 79 151 | 316 604 |
| Total | | 231 | 2 290 570 | 32 370 611 |

The application of determining the data taxonomy for defect detection as disclosed herein can be applied to Medicaid data. This application can provide a realistic context and bring evidence to the issue of data quality, which has not been systematically explored, understood, or addressed in most health organizations. The Medicaid data hold tremendous potentials to support the management and delivery of health and health services for socioeconomically disadvantaged and underserved populations. However, the deficiencies in the Medicaid data often reduce its usefulness to improve operations and decision making. Therefore, working on Medicaid data serves a useful long-term purpose in addition to providing a real context for study.

To contribute to reducing medical errors and improve patient safety, a cognitive taxonomy is used by systems and methods disclosed herein to categorize, explain, and prevent medical errors. Pursuing the first objective with similar motivations resulted in a comprehensive taxonomy comprised of defect categories and subcategories that are both stand-alone and interrelated. Taxonomy development involved 3 steps:

1. Document analysis: All of the available MMIS documents were examined to start learning about the expected data formats and values. This process enables the identification of first sets of defects and defect categories via visual examination of data. The documents included the user guides, value description files, and matrix files: the user guide provided information about the field descriptions in the 3 and 7 display screens of the Procedure and Provider subsystems, respectively; the value description files provided information about the full names about the variables in the datasets and their valid values; and the matrix files defined dependencies among certain data items.

2. Descriptive analysis: This step was performed to detect extreme or abnormal values in an effective and efficient manner. As not every such condition is necessarily a defect, further inquiries with the state officials were conducted as necessary. For analysis, the data tables were imported into the statistical environment, R(version 3.3.3) (R Foundation for Statistical Computing, Vienna, Austria), by paying close attention to the data formats. After importing the data, descriptive summary results were generated for each table, which included the number of rows, number of missing values, number of unique values, lowest values, highest values, means, medians, and percentiles. In light of the information gathered from the document analysis, each variable in the dataset was examined to identify potential violations by recognizing no-values, unexpected symbols such as a comma or a period in name field, and abnormal values such as "01/01/1901" or "12/31/9999" in date fields. Consequently, this examination on the Medicaid data supported the development and refinement of the defect taxonomy.

3. Literature review: To achieve a more comprehensive categorization of defects and consistency with the prior studies, a literature review was conducted by searching for relevant keywords such as data quality, data cleansing, dirty data, data defect, and data repair on Google Scholar and PubMed. Based on relevance, 15 articles were selected from 160 initially identified articles after reviewing their titles and abstracts. As a result, a reconciled, refined, and finalized defect taxonomy with the major and subcategories emerged. A software program was developed to detect defects by automatically identifying any violations of a set of stated constraints in the datasets. A constraint clearly specifies an expectation stated for data. An example constraint for Medicare beneficiaries can be that any value appearing in a cell under the age column must be 65 or above. A defect represents the violation of a constraint within a cell. The cell containing a defect is called a defective cell. A defective cell can be associated with multiple defects because there can be multiple violations for that cell. In the previous example, an additional constraint allowing no missing value for age would result in the possibility of detecting 0, 1, or 2 defects for a defective cell under the age column.

By definition, the existence of defects depends on the existence and statement of constraints that specify known expectations from the data. To the extent that the latter is known and complete, the former can be detected accurately. Therefore, guided by the taxonomy, a meaningful list of column-level constraints (i.e., constraints applying to all cells in the specified columns) was created. Writing constraints for individual cells is also possible, yet it requires detailed specification of expectations at the individual cell level, which was neither feasible nor needed.

In writing the constraints, the available MMIS documentation served as a source of reference. In addition, researchers worked closely with a data steward who was highly familiar with the datasets and associated data quality issues as well as how the interaction of various stakeholders (e.g., providers and end users) with MMIS affect data quality. As needed and inquired, the data steward searched for, located, and provided additional documents such as certain value description files. The data steward frequently answered questions over the email and phone during the creation of constraints and provided useful feedback and ideas. The constraints and results were shared with the data steward and other related department colleagues in a technical report and in presentations given during multiple in-person and online meetings that took place over the course of the study. Researchers incorporated the feedback to refine the constraints throughout the study.

By applying constraints to the data, the counts of defects and defective cells were obtained. To normalize for data volume, defect density, which is the number of defects in a table divided by the number of cells in that table, and defective cell density, which is the number of defective cells in a table divided by the number of cells in that table, were also calculated. The 95% confidence intervals were also calculated for the density measures.

The program was mainly developed using the Tool Command Language (Tcl). The use of Tcl as a high-level and interpreted scripting language facilitated program development. The program stores the data in the SQLite database. SQLite, as a serverless and standalone database, provided fast and reliable operations while facilitating the ease of development. The constraints were coded into the program as either a logical or regular expression by using the Standard Query Language. Multithreaded programming approach was adopted to improve performance.

FIG. 1 illustrates a block diagram of a system 100 of analyzing user-entered or machine-generated value in data for determining defective entries in accordance with embodiments of the present disclosure. Referring to FIG. 1, the system 100 includes a server 102, a user computing device 104, and data entry computing devices 1-N, 106A-106N (where N indicates that there may be N number of data entry computing devices). The server 102, user computing device 104, and data entry computing devices 106A-106N can be communicatively connected by one or more communications networks 108 (e.g., internet, cellular network, local area network, etc.). Although system 100 is described and shown as having a single server and various computing devices, it is noted that the system may include any suitable number and types of servers and computing devices having any suitable communication connection.

With continuing reference to FIG. 1, users of data entry computing devices 106A-106N may each include a user interface 110. A user of a data entry computing device (one of devices 106A-106N) can interact with the user interface 110 to access forms for entering data in the forms. For example, the forms may be web forms for data entry by the user. Web forms are pages that can be requested by a browser, used for remote data entry by the user, and sent to a server (e.g., server 102) for processing. Web forms can resemble paper or database forms because they can provide text fields, checkboxes, radio buttons, or the like for data entry. In this example, the data being entered is healthcare data, but it may alternatively be any other suitable type of data. The data may be entered into a form in a predetermined format such as, but not limited to, a table format, a row format, a column format, a cell format, a value format, or the like. Further, the entry of the data may be bound or limited by an entry constraint defined by, but not limited to, one or more of the following: a missing value, a date format, a value range, a correct set of values, syntax deviation, semantic inconsistency among values, duplication of value, or the like.

Forms 111 with entered data can be communicated from the computing devices 106A-106N to the server 102 and/or the computing device 104. The user computing device 104 can receive the forms 111 and store the forms 111 at a local data store 112. The server 102 can receive the forms 111 and stored the forms 111, including the user-entered or machine-generated data 116 contained in the forms 111, in memory 114. The user-entered or machine-generated data 116 can include values for the data such as, but not limited to, dates, codes, costs (e.g., dollar amounts), and the like. Further, the user-entered or machine-generated values may be organized in a predetermined entry format such as, but not limited to, a table format, a row format, a column format, a cell format, a value format, or the like.

The user-entered or machine-generated values may be entered incorrectly. For example, the values may be entered in the forms 111 via the user interface 110. The user interface 110 may include a physical user interface such as, but not limited to, a keyboard or touchscreen display. As a result, the user may inadvertently mistype data, thus resulting values have errors. Therefore, an error detected in data entry can be indicative and representative of a defective entry of the data by the user. Alternatively, a machine collecting data through sensors and entering data can enter wrong or incorrect value due to malfunctioning. Systems and methods disclosed herein can be utilized to determine the defective entries and present notification of these defective entries via a user interface. As a result, the presented defective entries can indicate the manual mis-entry of data by a user.

The server 102 includes a network interface 118 configured to receive the forms 111. The server 102 also includes a data entry analyzer 120 configures to receive the forms 111 (including the user-entered or machine-generated data 116), from the network interface 118, including the user-entered or machine-generated values. Each such value is organized in one or more predetermined entry formats. Further, the server 102 is configured to determine an entry constraint for each of the predetermined entry formats, to analyze each such value based on the determined entry constraint associated with the predetermined entry format of that value, and to determine one or more defective entries based on the analysis. The data entry analyzer 120 can hardware, software, firmware, or combinations thereof for implementing these functionalities and others disclosed herein. Alternatively, the data entry analyzer 120 include the memory 114 and one or more processors 122 for implementing these functionalities and others disclosed herein.

FIG. 2 illustrates a flow diagram of a method of analyzing user-entered or machine-generated value in data for determining defective entries in accordance with embodiments of the present disclosure. The method is described by example as being implemented by the system 100 shown in FIG. 1, although it should be understood that the method may be implemented by any suitable system having computing devices.

Referring to FIG. 2, the method includes receiving 200, at one or more user interfaces, entry of data by one or more users. For example, one or more of the users of computing devices 106A-106N can interact with the user interface of their respective computing device to access and enter data into a form 111, such as a web form. For example, the user may enter data via a keyboard and/or touchscreen display. The form 111 may be communicated to the computing device 106A-106N via server 102 or user computing device 104. Mis-entry of the data may appear and be represented by a value entered in the form 111.

The method of FIG. 2 includes communicating 202 the data to a server for processing and analysis. Continuing the aforementioned example, one or more of the computing devices 106A-106N can communicated one or more forms 111 to the server 102 via network(s) 108. The form(s) 111 may include data having defective entries. The server 102 may receive the form(s) via its network interface 118 and store some or all of the form(s) at memory 114. Therefore, the memory 114 can store user-entered or machine-generated data 116 for analysis to identify defective entries. The stored data 116 can include user-entered or machine-generated values, each being organized in a predetermined entry format.

The method of FIG. 2 includes determining 204 an entry constraint for each of the at least one predetermined entry formats. Continuing the aforementioned example, the data entry analyzer 120 can determine an entry constraint for each predetermined entry format of the user-entered or machine-generated values in the data 116. For example, entry constraint for the data can be defined by analysis of the data or based on constraints defined by authorized users, such as system administrators. There may be two levels for a defined constraint: narrative and rule. A narrative data entry constraint may be a higher level description of a given constraint. A rule data entry constraint may be a rule defined by SQL, a regular expression, or the like that is applied to the data to detect defects.

Further, it is noted that the data may be versioned. Particularly, an identifier of the version of the data may be stored in memory 114. Data versioning is used to review the earlier versions of data to view the defective values.

The method of FIG. 2 includes constructing 206 a data analysis routine based on the received data and the determined entry constraint for each of the predetermined entry formats. Continuing the aforementioned example, the data entry analyzer 120 can construct a data analysis routine 124 based on the received data and the determined entry constraint for each of the predetermined entry formats. The data analysis routine 124 may be utilized for analyzing data 116 or subsequently received data for determining defective defects. For example, the data analysis routine 124 may generate or construct the routine 124 including steps that identify defects by recognizing no-values entered in data, unexpected symbols in data such as a comma or a period in name field, and abnormal values in data such as "01/01/1901" or "12/31/9999" in date fields. For example, the routine 124 may have steps for: recognizing a format for date entry or a value range for the date entry; identifying a user-entered or machine-generated value for a date; and determining whether the user-enter value has an acceptable format and value range to identify whether the user-entered or machine-generated value is acceptable.

The method of FIG. 2 includes using 208 the data analysis routine to analyze each user-entered or machine-generated value based on the determined entry constraint associated with the predetermined entry format of that user-entered or machine-generated value. Continuing the aforementioned example, the data entry analyzer 120 can apply the data analysis routine 124 to the user-entered or machine-generated data 116 for identifying whether user-entered or machine-generated values are acceptable as compared to an acceptable format and value range for date entries. For a user-entered or machine-generated value to be acceptable, the user-entered or machine-generated value must adhere to the acceptable format and value range. Otherwise, it may be deemed a defective entry. In this way, the method can determine 210 that one or more of the entries are defective based on the analysis. This can be implemented by the data entry analyzer 120.

The method also includes using 212 a user interface to present notification of defective entries. Continuing the aforementioned example, the data entry analyzer 120 can communicate information 126 that indicates one or more defective entries in the data 116. The information 126 may be communicated from the server 102 to the user computing device 104 via network(s) 108. The user computing device 104 may receive the information 126, store the information in data store 112, and present the information via its user interface. The information and other of the data 116 may be presented via a 3D interface and/or VR interface. The computing device 104 may be configured to construct the 3D interface and/or VR interface for the received data and the defective entry(ies).

FIG. 3 illustrates a block diagram of a system 300 of detecting defective entries in data and presenting notification of the detected defective entries in accordance with embodiments of the present disclosure. Referring to FIG. 3, the system 300 includes a client computing device 302, a client-controlled data store 304, a set of worker computing devices 306, a server 308, and various external data sources 310. The client computing device 302 may be interacted with by a user 312 for creating a project and workspace for data defect detection. The user can interact with the computing device 302 to import data for defect detection analysis from the server 308 or from the external data sources 310. For external data sources 310 the user 312 can provide suitable authorization to link the data for analysis.

With continuing reference to FIG. 3, the server 308 can store metadata 314. There can be two types of metadata: definitions of imported data, and data constraints. A definition can define a predetermined entry format for data such as, but not limited to, table and column definitions. Data constraints can be defined by users. There can be two levels for a defined constraint: narrative and rule. Narrative is a higher level description of a given constraint. On the other hand, a rule can be the defined SQL and regular expression which can be implemented on data to detect defects. All metadata can be versioned.

The server 308 can also store measurement benchmarks for data quality, indicated as quality data 316. The results from previous defect detection can be stored here and available for users to view at any time as a report. The report can indicate how the data quality has improved or declined over time. Users can also set a benchmark for data quality.

The server 308 can also store teamwork data 318. All relevant user information can be stored here. New users can register in the system but may be able to register in the system. An approval email may be required for registration. Users can form teams within the system. Users can create a data quality project and invite team members to work collaboratively. Further, team members can dispatch tickets regarding issues they found in the data or assigning any task. Tickets can trigger a notification in the system as well as an email to all assignees. A user can be informed about tickets pending, approved, or declined. The system can accommodate a chatting functionality within the system for real-time collaboration.

At the client computing device 302, data intake functionality may be implemented. The computing device 302 can generate an initial diagnostic report upon receipt of imported data. Further, the computing device 302 can automatically generate a profile of imported data with descriptive statistics and distribution graphs. The viewed data may be paginated. The computing device 302 can keep track of each import of data and version them accordingly.

The client computing device 302 can also have quality measurement and improvement functionality 322. Here, users can run defect detection based on stored constraints. Further, multiple kinds of expressions can be created to find defects in data. Groups of defects according to their type can be created. For example, groups can include single column violation, multicolumn violation, etc. The computing device 302 can divide and dispatch defect detection work to the external workers 306 to expedite the process. If permitted, the computing device 302 can perform defect detection work on the source database with suitable optimization. The computing device 302 can also generate a longitudinal report showing the state of data quality. Users can use the computing device 302 to share the effect report with a data vendor for quality improvement. A dashboard can include recent project information, notifications, recent defect reports, and teammate information.

FIG. 4 is a flow diagram of a method of detecting defective entries in data and presenting notification of the detected defective entries in accordance with embodiments of the present disclosure. It is noted that the method of FIG. 4 is described as being implemented by the system 300 shown in FIG. 3, but it should be understood that the method may alternatively be implemented by any suitable system.

Referring to FIG. 4, the method includes a policy analysis portion 400 that may be implemented at an administrator's computing device. Policy analysis can include evaluating 400 policies and business rules. Subsequently, the method may determine 404 whether an update is required based on the evaluation. If no update is required, then no action is needed. If an update is required, the method may proceed to notify team members 406.

The method of FIG. 4 includes a team members portion 408 that may be implemented at the computing devices of the team members (e.g., client computing device 302 shown in FIG. 3). Here, metadata 410 can be received from a data steward 412, such as the server 308 shown in FIG. 3). Also, data can be ingested 411 and data access rules defined 413.

The method includes a step of describing 414 the metadata may be implemented. Team members can provide meanings for the data items which are stored as metadata. Further, the method includes a step of data profiling 416. Data profiling can generate data summaries such as minimum, average, median, and maximum values along with the frequency tables for values and outlier values. Subsequently, the method includes a step of creating, updating, and deleting 418 expectations for the data which are stored as metadata 410. Next, the method includes the step 420 of detecting defects and generating an evaluation report which include the count and percentages of defective values. Subsequently, the method includes determining whether there is satisfaction with the data quality. At this step, any satisfaction threshold deemed appropriate by the user can be adopted. If there is satisfaction with the data, then this information is passed on for policy analysis 400 for using 424 the data for decision making. If there is not satisfaction with the data, the method includes creating 426 a ticket with an identifier for the defect. The ticket may be communicated to a data operator's computing device 428 for fixing 430 the data defect and creating 432 a ticket that the data is fixed.

FIG. 5 illustrates a graph showing example taxonomy tree for data defects and programmer errors for various reasons such as calculation or data entry mistakes, which may be referred to as "distortion". Particularly, FIG. 5 shows the taxonomy tree for the 5 main and 17 subcategories for defects discussed next: missingness indicates the absence of a set of values expected to exist. In the utilized datasets, for example, there are some columns whose cells must never be empty under any circumstance, such as provider base number, provider number, which are primary keys in dataset, as well as other columns such as procedure name. The situation in which some value is absolutely required but missing is referred to as required-value missing. Conditionally-required-value missing subcategory refers to the absence of a value whose presence may be required or not depending on certain values appearing in other cells. For example, "Health Maintenance Organization" type must be filled when provider type is "HMO" and provider location is "00" in the same record. Dummy Entry is the value with no actual meaning (e.g., the presence of value "000000000" in the provider Social Security number field).

Incorrectness means that a value is outside of the set of values known to be correct. Implausible value refers to values outside of the range determined for the correct values, such as "1901-01-01" in provider service begin date, which is obviously improbable. Misspelling is the value with spelling error or typo. Misfielded value means a value shifted to a wrong column by mistake (e.g., via wrong input or a programming bug that affected data). In addition, there are distortions, simply incorrect values introduced by users.

Syntax violation refers to a deviation from the required syntax. When a column can only contain a list of valid codes as values, the codes not included in this list will be invalid code. For example, "00" is an invalid state code for a provider. Type mismatch refers to a situation where the value does not fulfill the requirement stated for data type (e.g., "12," a numeric value, appearing in the provider state column. Format mismatch occurs when some columns have constraints about the number of digits and specific combinations of alphabetical and numeric characters, yet, the value violates those constraints. For example, provider base number must be 7 digits; therefore, a 5-digit number found in dataset under the corresponding column represents a defect.

Semantic violation is related to the inconsistencies of information within and across columns. The dependency-contract violation subcategory indicates that the value is not in the value range or set, which is semantically determined by other columns. For instance, each provider specialty code determines a group of valid values for provider type; therefore, provider type cannot take a value outside of those determined by the provider specialty code in the same record. Another example is that provider service start date cannot be a date later than the end of service date. In these 2 examples, 2 columns have semantic relationships creating certain constraints that cannot be violated. Computational error takes place when value does not follow the computational relationships that need to be preserved with other columns (e.g., values in one column always being a proportion of the values in the other column in the same row). Misleading abbreviation refers to abbreviation that can be interpreted in multiple ways, such as "Dr", which could be interpreted as both "doctor" or "drive"; and "MD", which can be "Maryland" or "Medical Doctor." Different Unit indicates a numeric value in a measurement column which has a measurement unit different from that mainly used for the column (e.g., use of pound instead of kilogram).

Duplication indicates a violation of a stated requirement of avoiding the same or near-same (approximate) values. Duplication across entities subcategory refers to 2 or more entities with same primary key(s), which are supposed to be unique keys in the dataset. Duplication across features means same value in multiple features of one same attribute. For example, in the provider category of service table, there are 8 columns for provider category of service code because each provider can provide at least 1 and at most 8 categories of service. Thus, values in these 8 columns must be unique across the 8 features. Also, for a particular pair of records, all approximate values which indicate one same record can be referred as synonym. The approximate values may be missing or mismatching a few characters, or there could be upper-lower case mismatches.

Table 2 below shows the number of constraints associated with different defect types. In FIG. 6, Table 3 shows the number of defects detected by applying the set of constraints created. Overall, 3 151 743 defects were detected in 2 825 784 defective cells among 32 370 611 cells, with some cells having multiple defects. On average, 9.74 defects were detected in 8.73 cells for every 100 cells. Although less than the number of defects, the number of defective cells is considerably high. Defect count in a given cell varies from 1 to 21: 2 660 943 (94.17% of defective cells) cells include 1 defect per cell, while 164 415 (5.82%) cells include 2-10 defects per cell, and 426 (<0.02%) cells include 11-21 defects per cell.

TABLE 2

Distribution of constraints

| Subsystem | Table Name | Missingness | | Incorrectness | Syntax Violation | | Semantic Violation | Duplicity | | |
| | | Required Missing | Conditionally Missing | Implausible Value | Invalid Code | Format Mismatch | Dependency contract | DAE | DAF | Total |
|---|---|---|---|---|---|---|---|---|---|---|
| Procedure | Claim Type | 2 | 1 | 0 | 2 | 0 | 0 | 0 | 0 | 5 |
| | Coverage Group | 2 | 1 | 0 | 2 | 0 | 0 | 0 | 0 | 5 |
| | Master | 5 | 5 | 3 | 30 | 1 | 3 | 1 | 0 | 48 |
| | Modifier | 2 | 1 | 0 | 2 | 0 | 0 | 0 | 0 | 5 |
| | Place of Service | 2 | 1 | 0 | 2 | 0 | 0 | 0 | 0 | 5 |
| | Price | 4 | 1 | 2 | 1 | 0 | 1 | 0 | 0 | 9 |
| | Provider Type | 2 | 0 | 0 | 2 | 0 | 3 | 0 | 0 | 7 |
| | Specialty Code | 2 | 1 | 0 | 2 | 0 | 1 | 0 | 0 | 6 |
| Provider | Address | 6 | 0 | 2 | 3 | 2 | 4 | 1 | 0 | 18 |
| | Category of Service | 4 | 0 | 2 | 9 | 1 | 9 | 1 | 1 | 27 |
| | Enrollment Period | 2 | 0 | 1 | 2 | 1 | 1 | 1 | 0 | 8 |
| | Group | 4 | 0 | 2 | 1 | 1 | 1 | 1 | 0 | 10 |
| | Lab Classification | 4 | 0 | 2 | 2 | 1 | 0 | 1 | 0 | 10 |
| | Master | 17 | 2 | 16 | 24 | 7 | 21 | 1 | 1 | 89 |
| | Receiver | 1 | 0 | 2 | 0 | 1 | 0 | 1 | 0 | 5 |
| | Specialty | 6 | 0 | 1 | 2 | 1 | 1 | 1 | 0 | 12 |
| | Supplement | 2 | 0 | 2 | 1 | 1 | 0 | 1 | 0 | 7 |
| | Total | 67 | 13 | 35 | 87 | 17 | 45 | 10 | 2 | 276 |

DAE: duplication across entities; DAF: duplication across features.

The results revealed important data quality problems. FIGS. 7A and 7B are graphs depicting the defect counts and densities for the tables in the Procedure and Provider subsystems, respectively, with the 95% confidence intervals. FIGS. 8A and 8B depicts the counts and densities of defective cells. Particularly, FIGS. 8A and 8B are graphs showing the number of defective cells and defective cell density (defective cells per cell) for the tables in the Procedures and Provider subsystems, respectively, with the 95% confidence intervals. Considering either measure, the results are largely consistent about the most defect-prone tables: The modifier and specialty codes tables in the Procedure subsystem and the specialty, master, and address tables in the Provider subsystem had the highest count and density values for defects and defective cells. In fact, the defect density in these tables exceed 10% which is arguably high for the health datasets expected to support operations and decision making. Such observations can be useful to inform prioritized initiatives planned for data quality improvement.

In addition, certain types of defects appear to be more prevalent. Therefore, prioritized initiatives focusing on detecting and fixing those categories of defects may potentially lead to higher return on investment. FIG. 9 is a graph showing the number of defects and number of defects per constraint in each category and subcategory. Referring to FIG. 9, format mismatch, invalid code, dependency-contract violation, and implausible value categories have most contributed to the lack of data quality because of having the highest defect counts and defects per constraint.

More than 30% of defects fall into format mismatch category, detected by only 17 constraints. Wrong digit error was detected in columns such as provider base number, telephone number, and Social Security number. For example, provider base number is a 7-digit identification number for each provider; however, 36 970 records have provider base numbers which are not stated as 7-digit number in the provider master table.

About 30% of defects fall into invalid code, which is associated with the misuse of Medicaid codes and Medicaid indicators. It should be noted that all provider remittance media codes, all record codes, and more than 99.8% of Medicare part codes in the provider master table were wrong. There were 57 columns related to Medicaid codes and Medicaid indicators in the Procedure and Provider subsystems. Each column has a list of valid values, the number of valid values of each column varies from 2 to more than 100. The large use of Medicaid codes and Medicaid indicators, and similarities between them can mislead users and they would input wrong value by mistake. As the input validating features in MMIS have been mostly missing or ineffective, there is a high possibility that users provided invalid codes as input.

Next, almost 20% of defects are dependency-contract violations, which probably occurred due to the presence of mismatch between Medicaid codes. For example, each provider type code is associated with a group of valid provider category of service codes. In this case, the provider type and provider service code not only need to follow the syntax constraint, but also need to match with each other in a semantic manner. Usually, a value with syntax violation would also violate the dependency-contract violation constraint if it is dependent with another value.

About 30% of defects are implausible values. The most frequent case was that date entries were left empty by MMIS users to indicate "no start date" or "no end date." There are entered as "01/01/1901" or "12/31/9999", which are not acceptable (e.g., 166 171 "provider license withdraw dates" and 166 035 "federal first withheld dates" in the provider master table. The likely impact of the high percentage of detected defects in an organization is that various ad hoc and systematic defect detection, correction, and prevention activities can take place. As done, adopting ad hoc methods can be successful for detecting and correcting systemic defects (e.g., defects caused by software bugs, because they present certain patterns). However, detecting non-systemic defects (e.g., those resulting from invalid or wrong data entry) requires implementing a systematic approach that monitors data quality and informs IT adoption processes such as end user training and organizational workflows. While doing so, certain uses of data that still lead to acceptable results can be documented and shared within the organization. For example, it may be determined that it is still acceptable to analyze certain large datasets with missing values due to random missingness. As another example, the incorrect values might be occurring above a value threshold, say, for the elderly beneficiaries; therefore, analyzing the other portion of the data for an investigation solely focusing on younger beneficiaries can be acceptable.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. A computing device can also include any type of conventional computer, for example, a laptop computer or a tablet computer. A typical mobile computing device is a wireless data access-enabled device (e.g., an iPHONE® smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication, e.g. BLUETOOTH®. In addition to a conventional voice communication, a given mobile device can communicate with another such device via many different types of message transfer techniques, including BLUETOOTH®, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

REFERENCES

1. Rosenbaum S. Data governance and stewardship: designing data stewardship entities and advancing data access. Health Serv Res 2010; 45 (5p2): 1442-55.
2. Patel V L, Kushniruk A W, Yang S, Yale J F. Impact of a computer-based patient record system on data collection, knowledge organization, and reasoning. J Am Med Inform Assoc 2000; 7 (6): 569-85.
3. Dunkel B, Soparkar N. Data organization and access for efficient data mining. In: proceedings of the International Conference on Data Engineering (Cat. No. 99CB36337); 1999: 522-9.
4. Schroeder A T Jr. Data mining with neural networks: solving business problems from application development to decision support. J Am Soc Inf Sci 1997; 48 (9): 862-3.
5. Dinov I D, Petrosyan P, Liu Z, et al. The perfect neuroimaging-genetics computation storm: collision of petabytes of data, millions of hardware devices and thousands of software tools. Brain Imaging Behav 2014; 8 (2): 311-22.
6. Dinov I D. Volume and value of big healthcare data. J Med Stat Inform 2016; 4 (1): 3.
7. Saez C, Zurriaga O, Perez-Panad es J, Melchor I, Robles M, Garcia-Gomez J M. Applying probabilistic temporal and multisite data quality control methods to a public health mortality registry in Spain: a systematic approach to quality control of repositories. J Am Med Inform Assoc 2016; 23 (6): 1085-95.
8. Singer A, Yakubovich S, Kroeker A L, Dufault B, Duarte R, Katz A. Data quality of electronic medical records in Manitoba: do problem lists accurately reflect chronic disease billing diagnoses? J Am Med Inform Assoc 2016; 23 (6): 1107-12.
9. Lee S J C, Grobe J E, Tiro J A. Assessing race and ethnicity data quality across cancer registries and EMRs in two hospitals. J Am Med Inform Assoc 2016; 23 (3): 627-34.
10. Strong D M, Lee Y W, Wang R Y. Data quality in context. Commun ACM 1997; 40 (5): 103-10.
11. Corsi D J, Perkins J M, Subramanian S. Child anthropometry data quality from Demographic and Health Surveys, Multiple Indicator Cluster Surveys, and National Nutrition Surveys in the West Central Africa region: are we comparing apples and oranges? Glob Health Action 2017; 10 (1): 1328185.
12. Price M, Davies I, Rusk R, Lesperance M, Weber J. Applying STOPP guidelines in primary care through electronic medical record decision support: randomized control trial highlighting the importance of data quality. JMIR Med Inform 2017; 5 (2): e15.
13. Brennan P F, Stead W W. Assessing data quality from concordance, through correctness and completeness, to valid manipulatable representations. J Am Med Inform Assoc 2000; 7 (1): 106-7.
14. Tickner N, Ockner M. Preventing Death and Injury from Medical Errors Requires Dramatic, Systemwide Changes. Press Release. Washington, DC: Institute of Medicine, Division of Health Care Services; 1999.
15. Weiskopf N G, Weng C. Methods and dimensions of electronic health record data quality assessment: enabling reuse for clinical research. J Am Med Inform Assoc 2013; 20 (1): 144-51.
16. Lewis N. Poor data management costs healthcare providers. Inf Week Healthc 2012. https://www.informationweek.com/healthcare/clinical-information-systems/poor-data-management-costs-healthcare-providers/d/d-id/1105481. Accessed Aug. 22, 2019.
17. Christiansen-Lindquist L, Silver R M, Parker C B, et al. Fetal death certificate data quality: a tale of two US counties. Ann Epidemiol 2017; 27 (8): 466-71.
18. Lee C H, Yoon H J. Medical big data: promise and challenges. Kidney Res Clin Pract 2017; 36 (1): 3-11.
19. Yakout M, Elmagarmid A K, Neville J, Ouzzani M, Ilyas I F. Guided data repair. Proc VLDB Endow 2011; 4 (5): 279-89.
20. Botsis T, Hartvigsen G, Chen F, Weng C. Secondary use of EHR: data quality issues and informatics opportunities. Summit Transl Bioinforma 2010; 2010: 1-5.
21. Fowles J B, Lawthers A G, Weiner J P, Garnick D W, Petrie D S, Palmer R H. Agreement between physicians' office records and Medicare part B claims data. Health Care Financ Rev 1995; 16 (4): 189-99.
22. Van Der Bij S, Khan N, Ten Veen P, De Bakker D H, Verheij R A. Improving the quality of EHR recording in primary care: a data quality feedback tool. J Am Med Inform Assoc 2017; 24 (1): 81-7.
23. Porcheret M, Hughes R, Evans D, et al. Data quality of general practice electronic health records: the impact of a program of assessments, feedback, and training. J Am Med Inform Assoc 2004; 11 (1): 78-86.
24. Ash J S, Berg M, Coiera E. Some unintended consequences of information technology in health care: the nature of patient care information system related errors. J Am Med Inform Assoc 2003; 11 (2): 104-12.
25. Lehman M M. Programs, life cycles, and laws of software evolution. Proc IEEE 1980; 68 (9): 1060-76.
26. Lehman M M, Belady L A. Program Evolution: Processes of Software Change. San Diego, CA: Academic Press Professional, Inc; 1985.
27. Lehman M M, Ramil J F, Wernick P D, Perry D E, Turski W M. Metrics and laws of software evolution—the nineties view. In: proceedings Fourth International Software Metrics Symposium; 1997: 20-32.
28. Drouin N, Badri M. Investigating the applicability of the laws of software evolution: a metrics based study. In: Filipe J, Maciaszek L A, eds. ENASE 2013: Evaluation of Novel Approaches to Software Engineering. New York, NY: Springer; 2013: 174-89.
29. Banker R D, Datar S M, Kemerer C F, Zweig D. Software complexity and maintenance costs. Commun ACM 1993; 36 (11): 81-94.
30. Leonard C E, Brensinger C M, Nam Y H, et al. The quality of Medicaid and Medicare data obtained from CMS and its contractors: implications for pharmacoepidemiology. BMC Health Sery Res 2017; 17 (1): 304.
31. Rabia L, Amarouche I A, Bey K B. Rule-based approach for detecting dirty data in discharge summaries. In: proceedings of the 2018 International Symposium on Programming and Systems (ISPS); 2018: 1-6.
32. Cao H, Ma R, Ren H, Ge S S. Data-defect inspection with kernel neighbor-density-change outlier factor. IEEE Trans Automat Sci Eng 2018; 15 (1): 225-38.
33. Hudson C L, Topaloglu U, Bian J, Hogan W, Kieber-Emmons T. Automated tools for clinical research data quality control using NCI common data elements. AMIA Jt Summits Transl Sci Proc 2014; 2014: 60-9.
34. McManus B M, Rapport M J, Richardson Z, Lindrooth R. Therapy use for children with developmental conditions: analysis of Colorado Medicaid data. Pediatr Phys Ther 2017; 29 (3): 192-8.
35. Palmsten K, Huybrechts K F, Kowal M K, Mogun H, Hernandez-Diaz S. Validity of maternal and infant outcomes within nationwide Medicaid data. Pharmacoepidemiol Drug Saf 2014; 23 (6): 646-55.
36. Castillo V H, Martinez-Garcia A I, Pulido J. A knowledge-based taxonomy of critical factors for adopting electronic health record systems by physicians: a systematic literature review. BMC Med Inform Decis Mak 2010; 10 (1): 60.
37. Hennessy S, Leonard C E, Palumbo C M, Newcomb C, Bilker W B. Quality of medicaid and medicare data obtained through Centers for Medicare and Medicaid Services (CMS). Med Care 2007; 45 (12): 1216-20.
38. Iezzoni L I. Assessing quality using administrative data. Ann Intern Med 1997; 127 (8_Part_2): 666-74.
39. Federspiel C F, Ray W A, Schaffner W. Medicaid records as a valid data source: the Tennessee experience. Med Care 1976; 14 (2): 166-72.
40. Mehta N R, Medvidovic N, Phadke S. Towards a taxonomy of software connectors. In: Proceedings of the 22nd International Conference on Software Engineering. New York, NY: ACM; 2000: 178-87.
41. Lai L W. As planning is everything, it is good for something!: Coasian economic taxonomy of modes of planning. Planning Theory 2016; 15 (3): 255-73.
42. Ebell M H, Siwek J, Weiss B D, et al. Strength of recommendation taxonomy (SORT): a patient-centered approach to grading evidence in the medical literature. J Am Board Fam Pract 2004; 17 (1): 59-67.
43. Brennan A, Chick S E, Davies R. A taxonomy of model structures for economic evaluation of health technologies. Health Econ 2006; 15 (12): 1295-310.
44. Adler-Milstein J, Salzberg C, Franz C, Orav E J, Bates D W. The impact of electronic health records on ambulatory costs among Medicaid beneficiaries. Medicare Medicaid Res Rev 2013; 3 (2): mmrr.003.02.a03.
45. Bradley E H, Curry L A, Devers K J. Qualitative data analysis for health services research: developing taxonomy, themes, and theory. Health Sery Res 2007; 42 (4): 1758-72.
46. Sofaer S. Qualitative methods: what are they and why use them? Health Sery Res 1999; 34 (5 Pt 2): 1101-18.
47. Zhang J, Patel V L, Johnson T R, Shortliffe E H. A cognitive taxonomy of medical errors. J Biomed Inform 2004; 37 (3): 193-204.
48. Gardner M J, Altman D G. Confidence intervals rather than P values: estimation rather than hypothesis testing. BMJ 1986; 292 (6522): 746-50.
49. Ousterhout J K, Jones K. TCL and the TK Toolkit. London, United Kingdom: Pearson Education; 2009.
50. Scott W S, Ousterhout J K. Magic's circuit extractor. In: Proceedings of the 22nd ACM/IEEE Design Automation Conference. Piscataway, NJ: IEEE Press; 1996: 286-92.
51. Owens M, Allen G. SQLite. Berlin, Germany: Springer; 2010.
52. OwensM. TheDefinitive Guide to SQLite. New York, NY: Apress; 2006.
53. Gschwandtner T, G€artner J, Aigner W, Miksch S. A taxonomy of dirty time-oriented data. In: Quirchmayr G, Basl J, You I, Xu L, Weippl E, eds. CD-ARES 2012: Multidisciplinary Research and Practice for Information Systems. New York, NY: Springer; 2012: 58-72.
54. Oliveira P, Rodrigues F, Henriques P R. A formal definition of data quality problems. Presented at: International Conference on Innovation Quality (MIT IQ Conference); Nov. 10-12, 2005; Cambridge, MA.
55. Lee M L, Lu H, Ling T W, Ko Y T. Cleansing data for mining and warehousing. In: Bench-Capon T J M, Soda G, Tjoa A M, eds. DEXA 1999: Database and Expert Systems Applications. New York, NY: Springer; 1999: 751-60.
56. Barateiro J, Galhardas H. A survey of data quality tools. Datenbank-Spektrum 2005; 14 (15-21): 48.
57. Muller H, Freytag J C. Problems, methods, and challenges in comprehensive data cleansing. Professoren des Institut Für Informatik; Germany: Humboldt-Universitat zu Berlin; 2005.
58. Rahm E, Do H H. Data cleaning: problems and current approaches. IEEE Data Eng Bull 2000; 23 (4): 3-13.
59. Kim W, Choi B J, Hong E K, Kim S K, Lee D. A taxonomy of dirty data. Data Min Knowl Discov 2003; 7 (1): 81-99.
60. Li L, Peng T, Kennedy J. A rule based taxonomy of dirty data. J Comput 2018; 1 (2).
61. Wei W, Zhang M, Zhang B, Tang X. A data cleaning method based on association rules. In: ISKE (International Conference on Intelligent Systems and Knowledge Engineering). Paris, France: Atlantis Press; 2007: 1-5.
62. Naumann F. Data profiling revisited. Sigmod Rec 2014; 42 (4): 40-9.
63. Demsky B, Rinard M. Automatic detection and repair of errors in data structures. In: ACM SIGPLAN Notices: Proceedings of the OOPSLA'03 Conference. vol. 38. New York, NY: ACM; 2003: 78-95.

64. Hernandez M A, Stolfo S J. Real-world data is dirty: data cleansing and the merge/purge problem. Data Min Knowl Discov 1998; 2 (1): 9-37.

What is claimed is:

1. A system comprising:
    a plurality of data entry computing devices configured to receive a plurality of user-entered or machine-generated values, wherein each user-entered or machine-generated value is organized in at least one predetermined entry format, and configured to communicate the plurality of user-entered or machine-generated values;
    a data entry analyzer at a server comprising at least one processor and memory configured to:
        determine an entry constraint for each of the at least one predetermined entry formats;
        receive the communicated plurality of user-entered or machine-generated values;
        construct a data analysis routine based on the received communicated plurality of user-entered or machine-generated values and the determined entry constraint for each of the at least one predetermined entry formats;
        use the constructed data analysis routine to analyze each user-entered or machine-generated value based on the determined entry constraint associated with the predetermined entry format of that user-entered or machine-generated value;
        determine one or more defective entries based on the analysis;
        construct a three-dimensional (3D) interface and/or virtual reality (VR) interface for the received data and the one or more defective entries; and
    a user interface of one of the data entry computing devices or the server configured to use the constructed 3D interface and/or VR interface for presenting the one or more defective entries and for a user to alter presentation via the constructed 3D interface and/or VR interface.

2. The system of claim 1, wherein the data comprises healthcare data.

3. The system of claim 1, wherein the predetermined format of the data comprises one of a table format, a row format, a column format, a cell format, and a value format.

4. The system of claim 1, wherein the data entry analyzer is configured to provide the entry constraint.

5. The system of claim 1, wherein an entry constraint is defined as one or more of a missing value, a date format, a value range, a correct set of values, syntax deviation, semantic inconsistency among values, and duplication of value.

6. The system of claim 1, wherein the received data is a first set of data, and
    wherein the data entry analyzer is configured to:
    construct a data analysis routine based on the received data and the determined entry constraint for each of the at least one predetermined entry formats; and
    use the data analysis routine to analyze a second set of data for determining defective entries; and
    wherein the user interface is configured to present notification of the determined defective entries by use of the data analysis routine.

7. The system of claim 1, wherein the plurality of computing devices are each configured to receive manual entry of the user-entered or machine-generated values.

8. The system of claim 7, wherein the user interface comprises a keyboard and/or touchscreen display.

9. A method comprising:
    providing a plurality of data entry computing devices configured to receive a plurality of user-entered or machine-generated values, wherein each user-entered or machine-generated value is organized in at least one predetermined entry format, and configured to communicate the plurality of user-entered or machine-generated values;
    determining an entry constraint for each of the at least one predetermined entry formats;
    receiving, at a server, the plurality of user-entered or machine-generated values;
    constructing a data analysis routine based on the received communicated plurality of user-entered or machine-generated values and the determined entry constraint for each of the at least one predetermined entry formats;
    using the constructed data analysis routine to analyze each user-entered or machine-generated value based on the determined entry constraint associated with the predetermined entry format of that user-entered or machine-generated value;
    determining one or more defective entries based on the analysis;
    constructing a three-dimensional (3D) interface and/or virtual reality (VR) interface for the received data and the one or more defective entries; and
    using, at a user interface of one of the data entry computing devices or the server, the constructed 3D interface and/or VR interface for presenting the one or more defective entries and for a user to alter presentation via the constructed 3D interface and/or VR interface.

10. The method of claim 9, wherein the data comprises healthcare data.

11. The method of claim 9, wherein the predetermined format of the data comprises one of a table format, a row format, a column format, a cell format, and a value format.

12. The method of claim 9, wherein the data entry analyzer is configured to provide the entry constraint.

13. The method of claim 9, wherein an entry constraint is defined as one or more of a missing value, a date format, a value range, a correct set of values, syntax deviation, semantic inconsistency among values, and duplication of value.

14. The method of claim 9, wherein the received data is a first set of data, and
    wherein the data entry analyzer is configured to:
    construct a data analysis routine based on the received data and the determined entry constraint for each of the at least one predetermined entry formats; and
    use the data analysis routine to analyze a second set of data for determining defective entries; and
    wherein the user interface is configured to present notification of the determined defective entries by use of the data analysis routine.

15. The method of claim 9, wherein the plurality of computing devices are each configured to receive manual entry of the user-entered or machine-generated values.

16. The method of claim 15, wherein the user interface comprises a keyboard and/or touchscreen display.

* * * * *